United States Patent [19]
LaHaye et al.

[11] Patent Number: 5,765,596
[45] Date of Patent: Jun. 16, 1998

[54] CERAMIC HEAT EXCHANGER

[75] Inventors: Paul G. LaHaye, Kennebunk; Faress H. Rahman; Thomas P. E. Lebeau, both of Portland; Barbara K. Severin, Biddeford, all of Me.

[73] Assignee: HPS Merrimac, Portland, Me.

[21] Appl. No.: 491,038

[22] Filed: Jun. 16, 1995

[51] Int. Cl.$^6$ .................................................... F16D 1/00
[52] U.S. Cl. ........................... 138/38; 138/110; 138/153; 138/172
[58] Field of Search ................... 138/38, 110, 112, 138/113, 118.1, 123, 124, 129, 153, 172; 165/134.1, 906

[56]  References Cited

U.S. PATENT DOCUMENTS

| | | | |
|---|---|---|---|
| H263 | 5/1987 | Piscitella | 165/172 |
| 3,698,746 | 10/1972 | Loncaric | 138/178 |
| 3,877,514 | 4/1975 | Beck . | |
| 3,887,004 | 6/1975 | Beck | 165/179 |
| 4,029,465 | 6/1977 | LaHaye et al. . | |
| 4,060,379 | 11/1977 | LaHaye et al. . | |
| 4,102,632 | 7/1978 | Hastings | 138/38 |
| 4,134,449 | 1/1979 | LaHaye et al. . | |
| 4,144,020 | 3/1979 | LaHaye et al. . | |
| 4,332,295 | 6/1982 | LaHaye et al. . | |
| 4,437,217 | 3/1984 | LaHaye et al. . | |
| 4,452,563 | 6/1984 | Belanger et al. . | |
| 4,474,233 | 10/1984 | Swozil | 138/172 |
| 4,559,974 | 12/1985 | Fawley | 138/172 |
| 4,644,975 | 2/1987 | Fricker | 138/178 |
| 5,048,572 | 9/1991 | Levine . | |

*Primary Examiner*—David Scherbel
*Assistant Examiner*—James F. Hook

[57]  ABSTRACT

A tube containment system. The tube containment system does not significantly reduce heat transfer through the tube wall. The contained tube is internally pressurized, and is formed from a ceramic material having high strength, high thermal conductivity, and good thermal shock resistance. The tube containment system includes at least one ceramic fiber braid material disposed about the internally pressurized tube. The material is disposed about the tube in a predetermined axial spacing arrangement. The ceramic fiber braid is present in an amount sufficient to contain the tube if the tube becomes fractured. The tube containment system can also include a plurality of ceramic ring-shaped structures, in contact with the outer surface of the tube, and positioned between the tube and the ceramic fiber braid material, and/or at least one transducer positioned within tube for reducing the internal volume and, therefore, the energy of any shrapnel resulting from a tube fracture.

2 Claims, 5 Drawing Sheets

CERAMIC HEAT EXCHANGER

This invention was made with government support under Contract Numbers DE-FC21-90MC26008 and DE-AC21-94MC31327 awarded by the U.S. Department of Energy. The U.S. government has certain rights in the invention.

BACKGROUND OF THE INVENTION

1. Field of the Invention

The present invention relates to a system for containing internally pressurized tubes against explosive-like failure and, more particularly, to a system for containing internally pressurized ceramic heat exchanger tubes used in shell-and-tube-type heat exchangers under high pressures.

2. Description of the Related Art

In pressurized high temperature and corrosive applications, process equipment designs often require the use of ceramics and/or complex high-temperature alloys, for example, in heat exchangers. Generally, these materials must have good mechanical strength, hardness, thermal shock resistance, as well as corrosion resistance. In heat-exchange applications, these materials must also have good thermal conductivity. In addition to the foregoing, heat exchanger designs must also consider the flow path selection for the gases used. For example, in conventional shell-and-tube-type heat exchangers, wherein many tubes are aligned in parallel within a housing (shell), it is most preferable to pass the most corrosive gas around the outside diameter of the tubes and the higher-pressure, cleaner gas through an inside tube passageway of the exchanger.

Heat exchangers made from ceramic and/or high-temperature alloy materials are used in power generation plants, incineration plants, and/or hazardous waste disposal plants. Within these facilities, extensive use is sometimes made of gas/gas heat exchangers for preheating combustion air and/or waste streams, most notably in sludge incinerators and thermal oxidizers.

One such application of a ceramic tube heat exchanger is in an externally fired combined cycle (EFCC), such as that disclosed by LaHaye et al., in "Externally Fired Combined Cycle (EFCC) A DOE Clean Coal V Project: Effective Means of Rejuvenation for Older Coal-Fired Stations" (presented at the International Gas Turbine and Aeroengine Congress and Exposition, The Hague, Netherlands—Jun. 13-16, 1994), wherein a high temperature and high pressure coal fired process requires use of a heat exchanger with ceramic tubes. A disadvantage of using ceramic tubes in these applications is that they are brittle and over extended periods of time may eventually fracture. If this occurs, the high-pressure gas within the fractured tube can cause the tube to shatter into shrapnel which can impact adjacent tubes, causing their failure and ultimately the failure of the entire heat exchanger. Such a scenario is known in the art as a sequential, or catastrophic, failure. The explosion of one tube can cause failure of an entire heat exchanger system which could have, for example, 20 or more heat exchange tubes. Attempts to solve the potential problem of sequential failure in heat exchangers have been made using a variety of tube coverings. For example, by overlaying a cloth material layer over the outer surface of the individual tubes. Any complete covering or containment of the heat exchanger tubes, frequently adversely effects the tube's ability to transfer heat.

It is, therefore, an object of the present invention to provide a tube containment system for containing the shrapnel, which is formed when an internally pressurized tube fractures, and preventing the pieces of shrapnel impacting adjacent tubes. Such a system would permit continued operation of the heat exchanger, or allow for a controlled shut-down of the system.

It is a further object of the present invention to provide a tube containment system, for use in a heat exchanger, which does not significantly reduce heat transfer across the contained tube.

It is another object of the present invention to provide a tube containment system, for use in a heat exchanger, which increases heat transfer across the contained tube.

SUMMARY OF THE INVENTION

Accordingly, the present invention is directed to a tube containment system which can be used within a heat exchanger, while not significantly reducing heat transfer across the contained tube. The contained tube is typically internally pressurized, and is formed from a ceramic material having high strength, high thermal conductivity, and good thermal shock resistance, for example, selected from the group consisting of silicon carbide, silicon nitride, alumina, aluminum titanate, composites thereof, and the like.

In one embodiment of the present invention, the tube containment system includes at least one ceramic fiber braid disposed about the internally pressurized tube. The ceramic fiber braid is present in an amount that is sufficient to contain the tube if the tube becomes fractured. The material is disposed about the tube in a predetermined axial spacing arrangement, in which the ceramic braid material is typically either helically (spiral) disposed about the tube, or is disposed about the tube in a plurality of rings.

In all cases as used herein, the term "braid" includes all ceramic fiber product forms, and is discrete, i.e., it does not form a continuous covering over the surface of the tubes which would impair heat transfer; instead "braid" comprises spaced apart encircling axially elongated portions which may, for example, be continuous as in a helix or separate as in discrete rings. For example, the ceramic fibers can be used as a continuous fiber, a multi filament tow, a braid, a rope, and the like. The total braid thickness, i.e., the diameter of a rope for example or single or multiple filament rovings, windings or the like, can be from about 0.01 inch to 1 inch and preferably 0.01 to 0.5 inch.

In another embodiment of the present invention, the tube containment system includes a plurality of ceramic ring-shaped structures, in contact with the outer surface of the tube, and positioned between the tube and the ceramic fiber braid material. The thickness of the ceramic rings that cover the tube surface like the total thickness of the braid (distance perpendicular to the axis of the rope or ring) is also about 0.01 inch to 1 inch.

In another embodiment of the present invention, the tube containment system further includes, or has associated with it, at least one ceramic transducer, positioned within the tube for reducing the internal volume and, therefore, the energy of any shrapnel resulting from a tube fracture.

The method of containing a ceramic heat transfer tube against explosive shattering, while maintaining good heat transfer properties across the tube, includes wrapping the tube with discrete, high tensile strength encircling braids, spaced apart a predetermined distance to contain shrapnel, should the tube explode. In a further embodiment, the method includes placing a transducer within the tube to enhance the heat transfer, and reduce the internal volume of the tube to lessen the explosive effect should tube fracture occur.

3

Other objects and features of the present invention will become apparent from the following detailed description when taken in connection with the following drawings. It is to be understood that the drawings are designed for the purpose of illustration only and are not intended as a definition of the limits of the invention.

BRIEF DESCRIPTION OF THE DRAWINGS

The foregoing and other objects and advantages will be more fully appreciated from the following drawings in which.

DETAILED DESCRIPTION OF THE INVENTION

The present invention is directed to a tube containment system, and method, which can be used within a heat exchanger, while not significantly reducing heat transfer across the contained tube. The contained tube is typically internally pressurized, and is formed from a ceramic material having high strength, high thermal conductivity, and good thermal shock resistance. The present invention contains the tube, if it fractures, and prevents shrapnel from impacting and causing the failure of pressurized adjacent tubes within a heat exchanger. Often such tubes are used in pressurized heat exchangers, where at least between about 10 and 80 parallel, continuous path tubes can be maintained in a housing and sometimes 700 or more tubes can be used.

Figure 1:
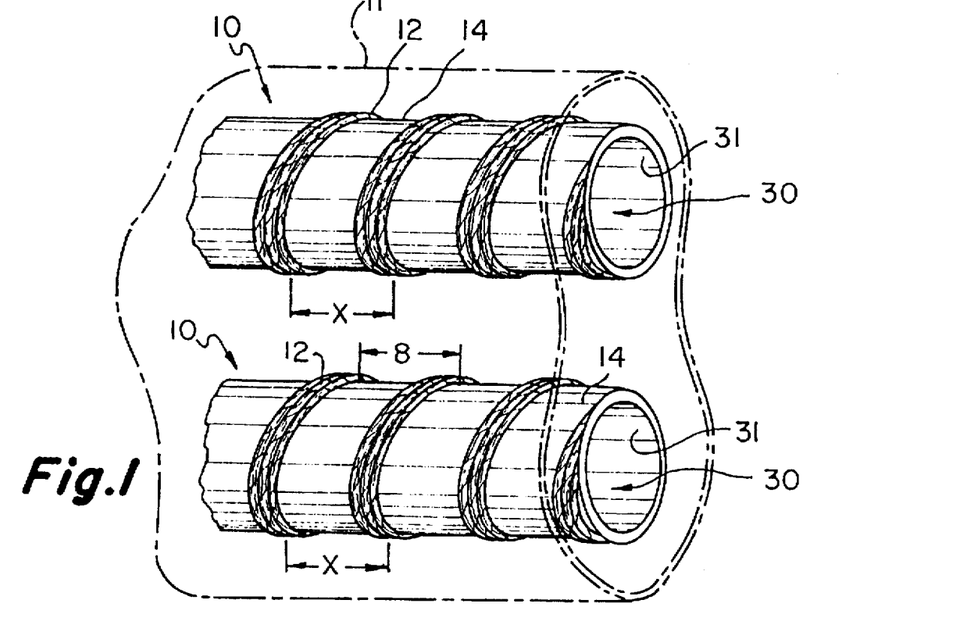
FIG. 1 is a perspective view of tubes, including one embodiment of the tube containment system of the present invention, positioned within a shell shown in phantom.

Referring now to the drawings, in which like reference numerals designate like or corresponding parts throughout the several views, a tube containment system is shown. FIG. 1 is a perspective view of one embodiment of a tube containment system 10 positioned within a housing, or shell, 11 (shown in phantom). The system includes at least one ceramic fiber braid 12 disposed about an internally pressurized tube 14. The ceramic fiber braid is present in an amount sufficient to contain the tube if the tube becomes fractured. As shown in FIG. 1, ceramic fiber braid 12 is helically disposed about tube 14, such that the braid has a predetermined axial separation distance or axial spacing X which is measured from the mid line of one braid turn or loop to the mid line of the next.

The maximum axial separation distance or spacing of the braid is determined by the minimum shrapnel momentum, resulting from the failed internally pressurized tube, which would be required to fracture a tube. The axial spacing must be small enough to contain all such shrapnel having a size greater than such spacing, with a momentum large enough to break adjacent tubes. Theoretically, therefore, if the momentum required to break an uncontained tube, and the volume and pressure within that tube are known, it is in principal possible to calculate the maximum axial spacing X required to contain the tube. It has been found, however, that other factors can be considered, and the maximum axial spacing X can be determined experimentally. Thus, the spacing is such as to contain large size shrapnel. One wants to have the spacing small enough to contain the size of shrapnel that would be destructive but, conversely, as far apart as possible to cause the least interference with heat transfer across the tube.

Fiber braid 12 used in the system of the present invention can be made of any material having a relatively high tensile strength, as well as high temperature stability. Preferably, the tensile strength of the braid is at least about 1 G Pa, and the braid is resistant to thermal degradation at temperatures as high as about 1300° C. and above. It has been found that in high temperature environments, a ceramic fiber braid, made from materials such as multi filament, textile-grade silicon carbide fibers, continuous polycrystalline metal oxide fibers suitable for producing textiles, (such as alumina, silica, and mixtures thereof), and the like, is most suitable. For example, ceramic fibers, such as NEXTEL™ 312, 440, 610 ceramic fibers (available from 3M Company, St. Paul, Minn.), and Nicalon™ ceramic fibers (available from Dow Corning Corporation, Midland, Mich.), can be used in the tube containment system of the present invention due to their thermal stability and tensile strength. These fibers are available, and can be used in the present system, in several physical forms, surface treatments and denier options.

As noted above, enough ceramic fiber braid 12 should be wrapped around tube 14 to contain the energy which would be released upon tube fracture, but no more braid should be used then necessary so as to avoid reducing heat transfer any more than necessary consistent with containing the shrapnel formed to prevent sequential failure of surrounding tubes when a single tube shatters. The tensile strength of the fiber braid, in part, determines the axial spacing and the quantity of the braid to be applied. The use of a ceramic fiber braid having a high tensile strength allows for fewer windings, and/or a wider axial separation. In addition to containing the tube upon fracture, it is also noted that, in heat-exchanger tube applications, the axial separation X of the ceramic fiber braid 12 should also maximize thermal transfer properties. Helical pitch of from about 1.0 inch to 3 inch are useful.

Tube 14 is typically made from a material which provides high hardness and strength, high thermal conductivity and good thermal shock resistance and which can be provided with a corrosion resistant coating.

In this regard, it has been found that silicon carbide-based materials and other ceramic materials are well suited for use as tube materials in high pressure heat exchangers. Suitable ceramic materials include silicon nitride, siliconized silicon carbide (also known as reaction bonded silicon carbide), sintered silicon carbide ($\alpha$ and $\beta$ modifications), and composites of alumina, silicon carbide and residual aluminum alloy. Alumina ceramics can also be used to form tube 14. Alumina materials have relatively high hardness and corrosion resistance; they include aluminum titanate, aluminum silicate (mullite), zirconia-toughened alumina, whisker-reinforced alumina, and other alumina composites. Zirconias have also been considered for this application. It is noted, however, that all of the ceramic materials suitable for use as tube 14 have a fracture toughness less than 10 MPa√m (the material's ability to resist crack growth or propagation), which makes them susceptible to brittle fracture. Moreover, these materials all have a relatively high elastic modulus, >300 giga Pascal (GPa), and fail in a brittle manner. The tube materials preferably having a hardness of greater than 10 GPa and preferably greater than about 20 GPa, a strength of about 50 to 600, MPa and preferably about 400 MPa thermal conductivity of greater than 30 (watts/meter Kelvin) W/mK and preferably >100 W/mK at room temperature, and thermal shock resistance of greater than 300° C. ΔT. The tube can be, for example, up to 20 ft or more in length and up to 6" in outside diameter, with a tube thickness of between ⅛ inch and ½ inch.

Figure 2:
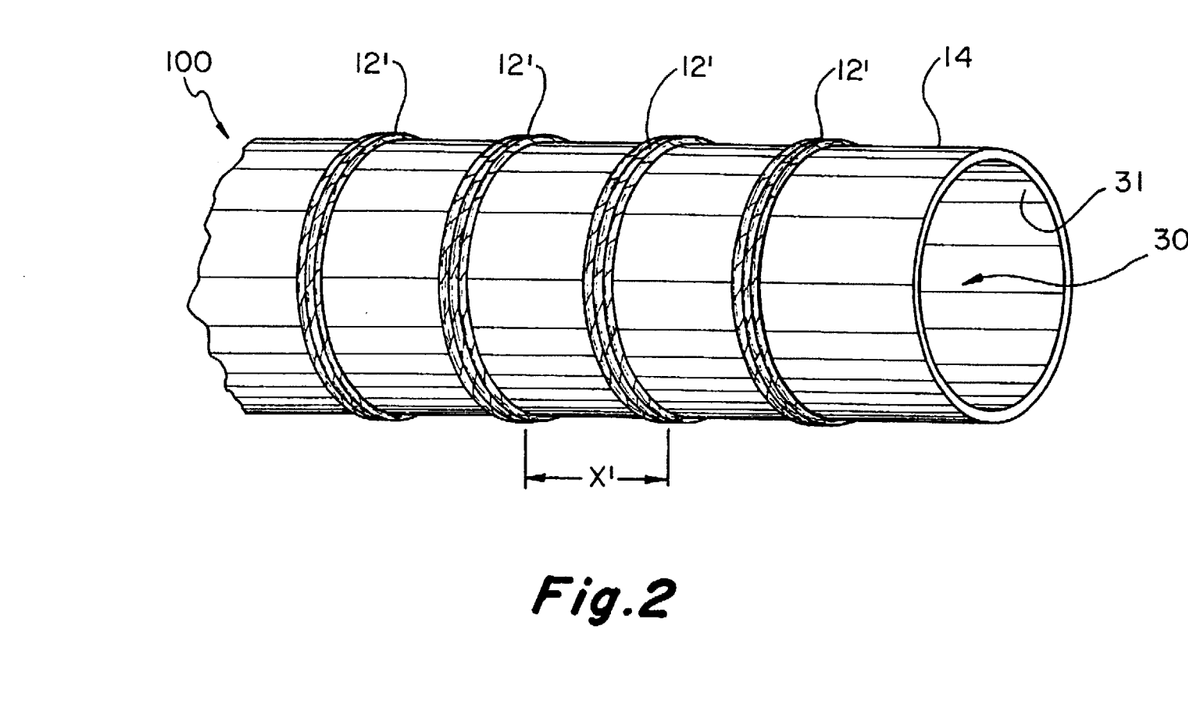
FIG. 2 is a perspective view of another embodiment of the tube containment system of the present invention.

Referring now to FIG. 2, a tube containment system 100 is shown wherein ring-shaped ceramic fiber braids 12' are disposed about tube 14 in a predetermined axial spacing X'. In this embodiment, the ceramic braid materials used to form helical windings (described above) are pre-formed as substantially ring-shaped braids which can then be positioned around a tube, preferably in direct contact with the outer surface of the tube.

Figure 3:
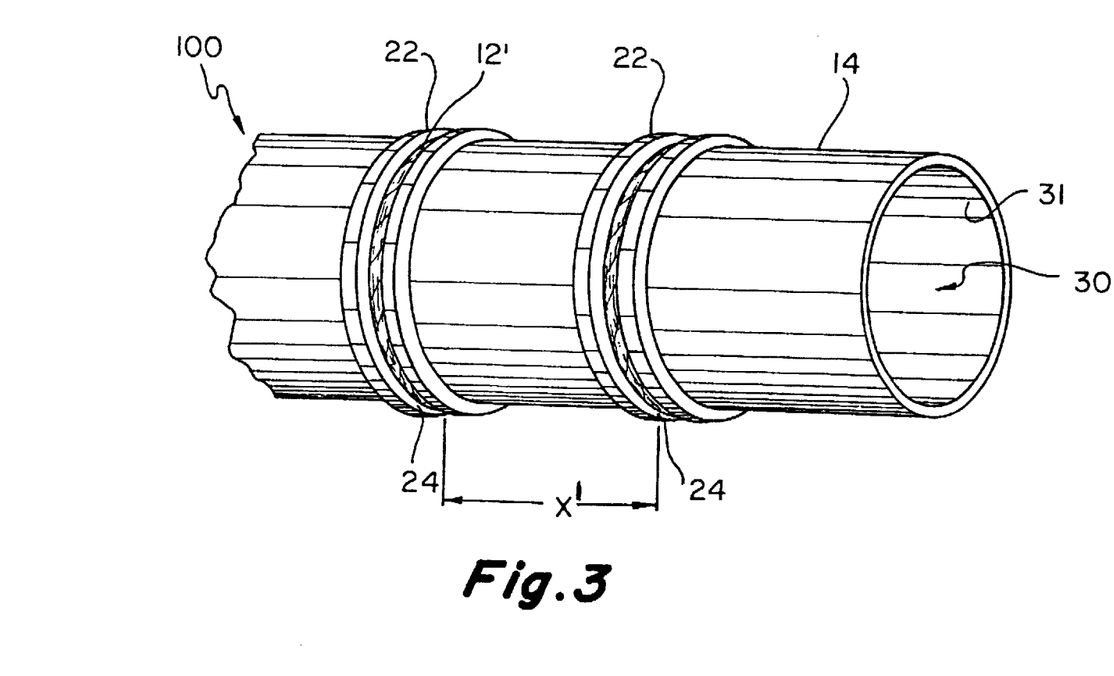
FIG. 3 is a perspective view of another embodiment of the tube containment system of the present invention.

A further alternative embodiment, utilizing the ceramic fiber ring-shaped structures 12', is shown in FIG. 3. The tube containment system 100 shown in FIG. 3 further includes a plurality of discreet ceramic rings 22 which are in contact with the outer surface of tube 14, but are not directly attached to the tube. The rings 22 are positioned between the tube and the plurality of ring-shaped ceramic fiber braids. The ceramic ring 22 can be formed from a material similar to or the same as that used to form tube 14. The ceramic ring 22 may include a groove 24, to act as a guide, or spool, for the ceramic fiber braid 12. The ceramic ring 22 does not act to contain the tube by itself. As noted above, the amount of fiber on each ring is determined, in part, by the tensile strength of the ceramic fiber and axial spacing. A possible advantage of the containment system shown in FIG. 3 is that individual ceramic fiber filaments can be wound onto the ceramic rings 22 without any additional processing of the fiber filaments, such as braiding, which can result in a reduction in relative properties due to damage of the individual fiber filaments. Thus, less fiber may be needed to achieve the tube containment. A further advantage of this embodiment is that the ceramic rings can act as fins on the heat exchanger tubes, thereby increasing the overall heat transfer surface area. In some cases, the rings can be replaced with a continuous ceramic spiral around the tube which is continuous from end to end of the tube. In some cases, the rings 22 can be attached to the tubes by a ceramic adhesive capable of withstanding the temperature of operation without significantly reducing heat transfer. Preferably, the rings, when used, have width corresponding to axial length along the axis of tube 14 of from 0.01 inch to 1 inch and a height or distance above the surface of tube 14 of from 0.01 inch to about 4 inches or higher.

As noted above, the amount of ceramic fiber braid required to achieve successful containment is, in part, determined by the amount of energy which is released when the tube fractures. The amount of energy which is released on tube fracture is determined by the tube material, the pressure differential between the inside and the outside of the tube, and the volume of the internal passageway of the tube. Therefore, by reducing the effective tube volume, the amount of fiber required to achieve containment can be reduced.

Figure 1A:
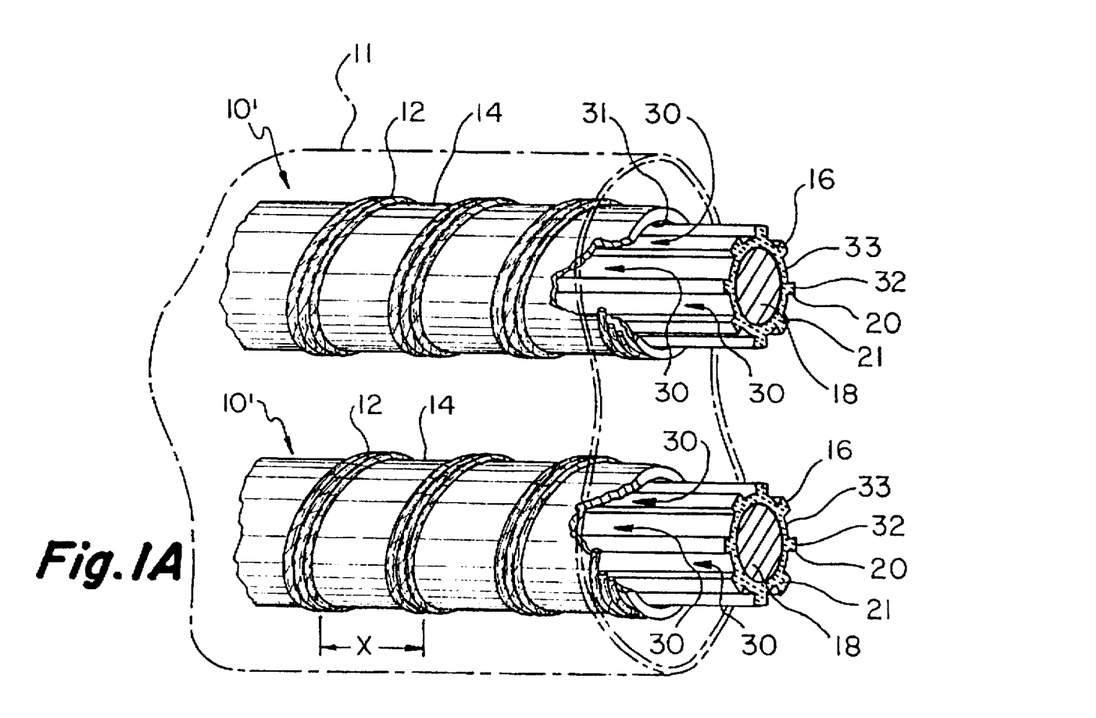
FIG. 1A is a perspective view of the tubes, positioned as shown in FIG. 1, each tube incorporating a transducer.
Figure 2A:
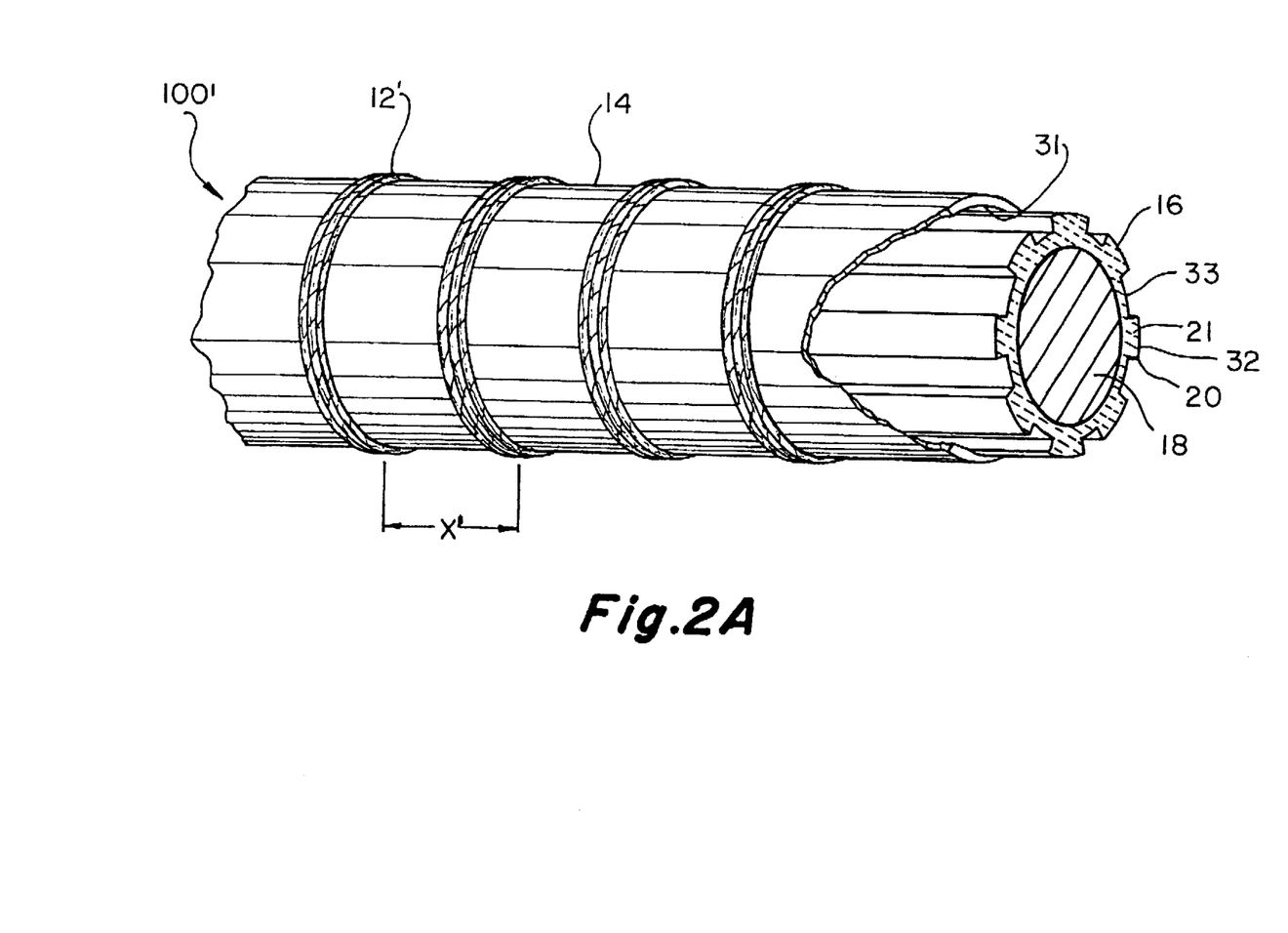
FIG. 2A is a perspective view of the tube shown in FIG. 2, incorporating a transducer.
Figure 3A:
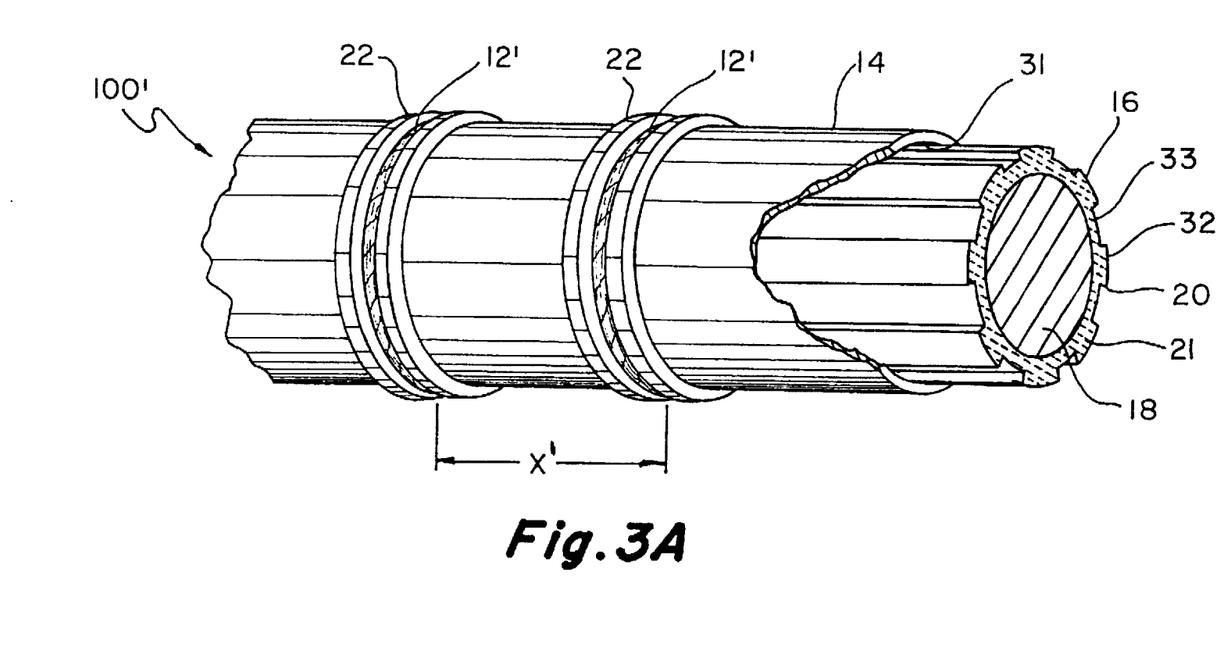
FIG. 3A is a perspective view of the tube shown in FIG. 3, incorporating a transducer.

As shown in FIG. 1A, FIG. 2A, and FIG. 3A, each embodiment of the present invention can include at least one transducer 16. The transducers 16 typically include a core 18 and fluted sides 20. The transducer is typically made from a ceramic material which may be the same as the tube material, having properties similar, or identical, to that of tube 14; it may be monolithic, or may have a core 18 made from a material, such as silicon carbide, while the fluted outer sides 20 can be made of a heat resistant material, such as a fireclay. While the transducer 16 reduces the internal volume of tube 14, it increases the fluid velocity, as the fluid passes between the inner tube wall and the fluted outer sides. The transducer also acts to break up the viscous boundary layer on the inside diameter of the tube. It is noted, therefore, that the ceramic transducers 16, which reduce energy available to fracture tube 14, in combination with the ceramic fiber braid material 12 on the outer surface of tube 14, combine to provide a tube containment system which prevents shrapnel-like pieces from escaping with enough momentum to fracture adjacent tubes. Moreover, when the gas flow inside the tube is increased at the periphery of the transducer in the passageway 30, provided adjacent the inner surface of the tube 31, heat transfer is enhanced between the outer surface of the tube and the gas within the tube. Preferably, the flutes 21 center the transducer and have minimal surface area at the surface 32 which contact the inner tube surface 31. Thus, each arcuate surface 32 has a small degree of radius in contact with the inner tube surface 31. In a preferred embodiment, the individual flute portions are triangular in cross-section, rather than rectangular, as shown in FIGS. 1 A, 2A, and 3A. The flutes can be continuous from end to end of the tube, but are preferably discontinued and thus have physical interruptions to cause the boundary layer film to break up, i.e. detach itself and mix with the bulk of the gas flow. The point of the triangle is in contact with inner tube surface 31. Preferably, at least three flutes 21 are required to center transducer 16 within tube 14. The transducers preferably extend the entire length of each tube 14, as do the flutes shown, for example, at FIG. 2A. In addition, the flutes 21 can be parallel to the elongated axis of the core, as in the preferred embodiment, or helically disposed on the transducer 16.

The thickness of the spacing between the inner tube surface 31 and the transducer outer surface 33, forming the base of the flutes 21, defines the gas flow velocity. This spacing can vary to maximize heat transfer and reduce the internal volume of the tube. Typically, when tube 14 internal diameters are from 3 inches to 3.75 inches, the diameters of the core at surface 33 and the number and size of flutes 21 are designed to prove a cross-sectional flow area perpendicular to the axis of the tube of from 1 square inch to 6 square inches, the core thus being sized to obtain the desired velocity through the flutes to maximize the heat transfer coefficient.

The present invention will be further illustrated by the following examples which are intended to be illustrative in nature and is not to be construed as limiting the scope of the invention.

EXAMPLE I

To determine the performance of a variety of tube materials, and the effectiveness of transducers positioned within the tube to reduce the total energy, ballistics tests were performed on pressurized tubes. In all of the tests, a ball bearing projectile was fired into the outside surface of a tube, with and without the transducers in place. In all of the tests, the tube was pressurized to 150 psig.

Test number 1 used an uncontained mullite ($3Al_2O_3 \cdot 2SiO_2$) tube having an inner diameter of 3.5 inches and an outer diameter of 4.0 inches. Test number 2 used an uncontained alumina/silicon carbide particulate composite tube (Dupont Lanxide Composites, Du Pont Du Nenours Co., Wilmington, Del.), having an inner diameter of 3.5 inches and an outer diameter of 4.0 inches. Test numbers 3, 4 and 5 used uncontained coarse grain reaction bonded silicon carbide tubes (Carborundum Company, Niagara Falls, N.Y.), having an inner diameter of 3.3 inches and an outer diameter of 3.8 inches. Test numbers 1, 2, and 3 were evaluated without a transducer; test numbers 4 and 5 were evaluated with #200 fireclay fluted transducers, having Harbide-80 silicon carbide castable refractory cores, positioned within the tube.

The tests were performed to determine (1) the momentum required to break the tube (in kg m/s), and (2) the total kinetic energy of shrapnel, obtained by means of a high speed video camera, resulting from the fractured tube per tube length (in J/m). The experimental results are presented in Table 1.

TABLE 1

| Test No. | Tube Configuration | Momentum (kg m/s) kilogram/meter second | Total Kinetic Energy of Shrapnel per Tube Length (J/m) Joules/meter |
|---|---|---|---|
| 1 | Uncontained mullite tube | 0.15 | N/A |
| 2 | Uncontained alumina/ silicon carbide particulate composite tube | 0.19 | 948 |
| 3 | Uncontained coarse grain reaction bonded silicon carbide tube | 0.13 | 600 |
| 4 | Uncontained coarse grain reaction bonded silicon carbide tube with fireclay transducers | 0.12 | 42 |
| 5 | Uncontained coarse grain reaction bonded silicon carbide tube with fireclay transducers | 0.13 | 171 |

The test results indicate that the momentum required to fracture the tube varied with the tube material and size/thickness, regardless of the presence of the transducer. The total kinetic energy of the shrapnel resulting from the fractured tube per tube length, however, as would be expected, was significantly reduced when the transducers were positioned within the tube. The kinetic energy per tube length reported in test number 3 (600 J/m) is over three times greater than that of test numbers 4 or 5 (42 J/m and 171 J/m). Thus, the incorporation of transducers within a tube can lessen the amount of external tube containment required as well as improve the external heat transfer performance of the assembly.

EXAMPLE II

To determine the performance of a variety of external containment configurations on an internally pressurized tube, ballistics tests were performed. In all of the tests a ball bearing projectile was fired into the outside of a tube containing a transducer, which was pressurized to 150 psig.

All of the tests used coarse grain reaction bonded silicon carbide tubes (Carborundum Company, Niagara Falls, N.Y.), having an inner diameter of 3.3 inches and an outer diameter of 3.8 inches. Test numbers 1 and 2 used a tube containment configuration having a single winding, helical (spiral) wrap of NEXTEL™ 312 ceramic fiber braid (a trademark of 3M Company, St. Paul, Minn.) with a 0.5 inch axial spacing. The ceramic fiber braid is made from 900 denier fibers in a 1.5 z configuration; it is a hollow core ⅙th inch braid with a total fiber width or thickness on the tube (total width of fiber along the tube axis) of 0.12 inch. Test number 3 used a double winding of NEXTEL™ 312 ceramic fiber braid with a 1.0 inch axial spacing and a total braid thickness of 0.2 inch. In Test number 4, the tube was spirally wrapped with four windings of Nextel™ 312 braid with 1.5 inch axial spacing. The rope or total braid thickness was 0.25 inch. In Test number 5, the tube was spirally wrapped with four winds of Nicalon™ roving at 1.5 inch axial spacing. The roving total thickness was 0.2 inch. The Nicalon™ roving had 24 ends of 1800 denier tows served with nylon. Test number 6 used four windings of NEXTEL™ 312 ceramic fiber braid with a 2.0 inch axial spacing and with a total rope thickness of 0.25 inch. Test number 7 used a tube containment configuration having unattached mullite grooved rings, 0.5 inch wide and 0.135 inch total thickness, positioned between the tube and three ring windings, of NEXTEL™ 312 ceramic fiber braid; the rings had a 1 inch axial spacing. Test number 8 used a containment configuration having unattached graphite grooved rings, 0.5 inches wide and 0.5 inches thick, positioned between the tube and 150 turns of 1500 denier NEXTEL™ 610 tows. Test number 9 used a containment configuration having graphite grooved rings, 0.5 inches wide and 0.5 inches thick, attached to the tube using Cotronics 989 alumina adhesive, obtained from Cotronics Corp. of Brooklyn, N.Y., the ring being positioned between the tube and 150 turns of 1800 denier Nicalon™ tows.

The tests were performed to determine (1) the momentum required to break the tube (in kg m/s), and (2) the total kinetic energy of shrapnel resulting from the fractured tube per tube length (in J/m). The experimental results are presented in Table 2.

TABLE 2

| Test No. | Tube Configuration | Momentum (kg m/s) second | Total Kinetic Energy of Shrapnel per Tube Length (J/m) |
|---|---|---|---|
| 1 | Tube spirally wrapped with 1 wind of Nextel ™ 312 and 0.5 inch axial spacing | 0.16 | 0.0 |
| 2 | Tube spirally wrapped with 1 wind of Nextel ™ 312 braid and 0.5 inch axial spacing | 0.12 | 0.0 |
| 3 | Tube spirally wrapped with 2 winds of Nextel ™ 312 braid and 1.0 inch axial spacing | 0.24 | 0.0 |
| 4 | Tube spirally wrapped with 4 winds of Nextel ™ 312 braid and 1.5 inch axial spacing | 0.13 | 0.0 |
| 5 | Tube spirally wrapped with 4 winds of Nicalon ™ roving (24 ends of 1800 denier tows) and 1.5 inch axial spacing | 0.23 | 11.5 |
| 6 | Tube spirally wrapped with 4 winds of Nextel ™ 312 braid and 2.0 inch axial spacing | 0.11 | 0.0 |
| 7 | Tube with mullite rings, 1 inch axial spacing containing 3 winds of Nextel ™ 312 braid | 0.13 | 4.2 |
| 8 | Tube with graphite rings, 1.5 inch axial spacing, filament wound with 150 turns of 1500 denier of Nextel ™ 610 tows | 0.16 | 3.8 |
| 9 | Tube with graphite rings, | 0.15 | 0.0 |

TABLE 2-continued

| Test No. | Tube Configuration | Momentum (kg m/s) second | Total Kinetic Energy of Shrapnel per Tube Length (J/m) |
|---|---|---|---|
| | 1.5 inch axial spacing, filament wound with 150 turns of 1800 denier Nicalon ™ tows. Rings attached to tube with Cotronics 989 alumina adhesive | | |

All Nextel ™ 312 braid comprises 24 ends of 900 denier tows.

The test results indicate that the momentum required to fracture the tube varied only slightly. The relatively high momentum measured in test numbers 3 and 5 was due to the ball bearing directly impacting the ceramic fiber braid. The kinetic energy per tube length reported in test number 5 (11.5 J/m), in test number 7 (4.2 J/m), and in test number 8 (3.8 J/m) resulted from a few small pieces of escaped shrapnel which had insufficient momentum to cause fracturing of a similar tube (sequential failure). Therefore, it is apparent that a variety of tube containment configurations can be used to contain shrapnel. Moreover, it is apparent that the axial spacing of the ceramic fiber braid winding can effectively be increased by increasing the number of braids in the winding about a tube. For example, a single winding of the braid allowed axial spacing of about 0.5 inch, while a double braid winding had axial spacing of 1.0 inch, and four braid winding had a spacing of 2.0 inches. It has been found, however, that for the materials evaluated in these examples, a winding axial spacing of about 2.0 inches was preferred to assure containment of the shrapnel which was larger than the 2 inch spacing.

Generally, the upper limit of the axial separation is determined by the size of shrapnel that is produced when a tube fails. The upper limit is therefore essentially a function of the tube material. Generally, this lower limit of shrapnel size is 3 inches or thereabout for brittle ceramic. Generally, 2.0 inch separation of the braid is the preferred upper limit, based on tube materials preferred for use in this invention. The actual axial separation used in practice is that which maximizes the heat transfer but which also contains the tube. Generally speaking, the heat transfer is a function of the surface area of the tube which is not covered by the reinforcement. Therefore, increasing the axial spacing would increase the heat transfer.

Although particular embodiments of the invention have been described in detail for purposes of illustration, various modifications may be made without departing from the spirit and scope of the invention. For example, while circular cross-section heat exchange tubes are described with helical or circular ring containment structures, a variety of tube cross-sectional shapes, and corresponding containment structures can be used. The transducers used can be continuous or discontinuous along the tube's elongated axis. Other shapes, rings, and materials can be used. It is noted that by "contain" it is meant that the present system substantially prevents particles from exploding outwardly with a force sufficient to fracture adjacent tubes, or other structures, even though some small amounts (and size of) particles may escape containment. Accordingly, the invention is not to be limited except as by the appended claims.

What is claimed is:

1. A tube containment system, comprising:

at least one ceramic fiber braid disposed about a tube to be internally pressurized, said tube having an outer surface and an elongated internal volume, said ceramic fiber braid being present in an amount sufficient to contain shrapnel of said tube if fractured said tube being formed from a ceramic material having high strength, high thermal conductivity, and good thermal shock resistance, said ceramic fiber braid being disposed about said tube in a predetermined axial spacing arrangement in the range of from about 1.0 inch to 3 inch, said ceramic fiber braid being disposed about said tube in a plurality of ring-shaped fiber braids, wherein said system further comprises a plurality of ceramic rings in contact with the outer surface of said tube, and positioned between the tube and the plurality of ring-shaped ceramic fiber braids.

2. A tube containment system, comprising:

at least one ceramic fiber braid disposed about an internally pressurized ceramic tube having an outer surface and internal passageway and an internal surface, at least one ceramic transducer positioned within said tube to permit increased velocity fluid flow adjacent said internal surface, said ceramic fiber braid being present in an amount sufficient to contain said tube if fractured, said tube being formed from a ceramic material having high strength, high thermal conductivity, and good thermal shock resistance, said ceramic fiber braid being disposed about said tube in a predetermined axial spacing arrangement, said ceramic fiber braid being disposed about said tube in a plurality of ring-shaped fiber braids, said system further comprises a plurality of ceramic rings in contact with the outer surface of said tube, and positioned between the tube and the plurality of ring-shaped ceramic fiber braids.

* * * * *